US012730897B2

(12) United States Patent
Milosevic et al.

(10) Patent No.: US 12,730,897 B2
(45) Date of Patent: Sep. 8, 2026

(54) AUTOMATION PLATFORM FOR PENTEST COLLABORATION

(71) Applicant: Acronis International GmbH, Schaffhausen (CH)

(72) Inventors: Igor Milosevic, Smederevo (RS); Candid Wuest, Bassersdorf (CH); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 361 days.

(21) Appl. No.: 18/145,787

(22) Filed: Dec. 22, 2022

(65) Prior Publication Data

US 2024/0211605 A1 Jun. 27, 2024

(51) Int. Cl.
*G06F 21/57* (2013.01)
*G06N 3/09* (2023.01)

(52) U.S. Cl.
CPC ............. *G06F 21/577* (2013.01); *G06N 3/09* (2023.01); *G06F 2221/034* (2013.01)

(58) Field of Classification Search
CPC ...... G06F 21/577; G06F 21/57; G06F 21/552; G06F 2221/034; G06N 20/00; G06N 3/09; G06N 3/08
See application file for complete search history.

(56) References Cited

U.S. PATENT DOCUMENTS

| | | | | |
|---|---|---|---|---|
| 10,949,337 | B1 * | 3/2021 | Yalla | G06F 11/3688 |
| 2005/0160286 | A1 * | 7/2005 | Currie | G06F 21/577 726/22 |
| 2014/0237606 | A1 * | 8/2014 | Futoransky | G06F 21/552 726/25 |
| 2019/0317879 | A1 * | 10/2019 | Mccormick | G06F 11/3608 |
| 2020/0234155 | A1 * | 7/2020 | Ares | G06F 16/258 |
| 2020/0285978 | A1 * | 9/2020 | Chen | G06N 20/00 |
| 2020/0344256 | A1 * | 10/2020 | Alabdulhadi | H04L 63/205 |
| 2021/0365855 | A1 * | 11/2021 | Doan | G06Q 10/06311 |
| 2022/0147637 | A1 * | 5/2022 | Melamed | G06F 21/6218 |
| 2022/0201042 | A1 | 6/2022 | Crabtree et al. | |
| 2024/0281540 | A1 * | 8/2024 | Mizushima | G06F 21/577 |

FOREIGN PATENT DOCUMENTS

| | | | |
|---|---|---|---|
| CN | 113660241 | A | 11/2021 |
| CN | 114303147 | A | 4/2022 |
| CN | 114417345 | A | 4/2022 |
| WO | 2019079621 | A1 | 4/2019 |

* cited by examiner

*Primary Examiner* — Alexander Lagor
*Assistant Examiner* — Brandon Binczak
(74) *Attorney, Agent, or Firm* — ESPE Legal Consultancy FZ-LLC

(57) ABSTRACT

The present disclosure relates to a system and method of automatically updating change test scenarios based on historical data about the system under test (SUT), its elements, their properties, testing environment, its characteristics and testing steps with their settings using AI. Once the AI has enough historical data, every time a change is made to the SUT, its elements, their properties, or at least one characteristic of the testing environment, the AI system makes a recommendation to update at least one setting of at least one test step in testing scenario.

20 Claims, 2 Drawing Sheets

AUTOMATION PLATFORM FOR PENTEST COLLABORATION

FIELD OF THE INVENTION

The present disclosure generally relates to the cybersecurity of information systems. Specifically, this disclosure is related to security testing of information systems and the use of artificial intelligence to configure security testing scenarios.

BACKGROUND OF THE INVENTION

Current systems for computer security testing require intensive and time-consuming human interaction to develop security test scenarios when a configuration of elements of an information system under testing (SUT) changes.

A method and system are needed that automatically update the security test scenario when the configuration of elements of the information system under test changes.

SUMMARY OF THE INVENTION

This disclosure describes a method and a system that automatically generates a set of parameters of a security test scenario based on historical data preserved within a test management system (TMS).

Specifically, that system takes as input historical data about configurations of elements of SUT that have been marked as safe in a test management system (TMS), as well as parameters of security test scenarios corresponding to these configurations.

A neural network is employed that has been trained using embeddings of two sets of data from the historical data: configurations of elements of SUT and parameters of security test scenarios. An embedding in this context refers to a numeric representation of a set of data.

The configuration of each element of the system has a finite number of individual settings, and each setting has a limited range. If a setting has an unlimited range, for example, a free-hand text field or duration of time, that parameter is artificially limited to a range. Then, an array of numeric representations of each setting of the configuration becomes the embedding of a given configuration of length N (N-embedding).

The parameters of each security test scenario have a finite number of individual settings, and each setting has a limited range. An array of numeric representations of each setting of the security test scenario becomes the embedding of a given security test scenario of length M (M-embedding).

Pairs of N-embeddings and M-embeddings of configurations of elements of SUT and corresponding parameters of security test scenarios are used to train a neural network NN that takes N-embeddings as input and outputs M-embeddings.

Once the neural network is fully trained, the AI recommendation module starts operation.

Once the system obtains information about a new state of the configuration of an element of SUT, the N-embedding of that configuration is calculated and used as an input into the neural network NN.

Neural network NN uses the N-embedding of the new configuration of the element of SUT as input and outputs an M-embedding of parameters of a security test scenario.

The M-embedding output by the neural network NN is used to generate parameters of a security testing scenario that are added to the test management system TMS.

DETAILED DESCRIPTION

Figure 1:
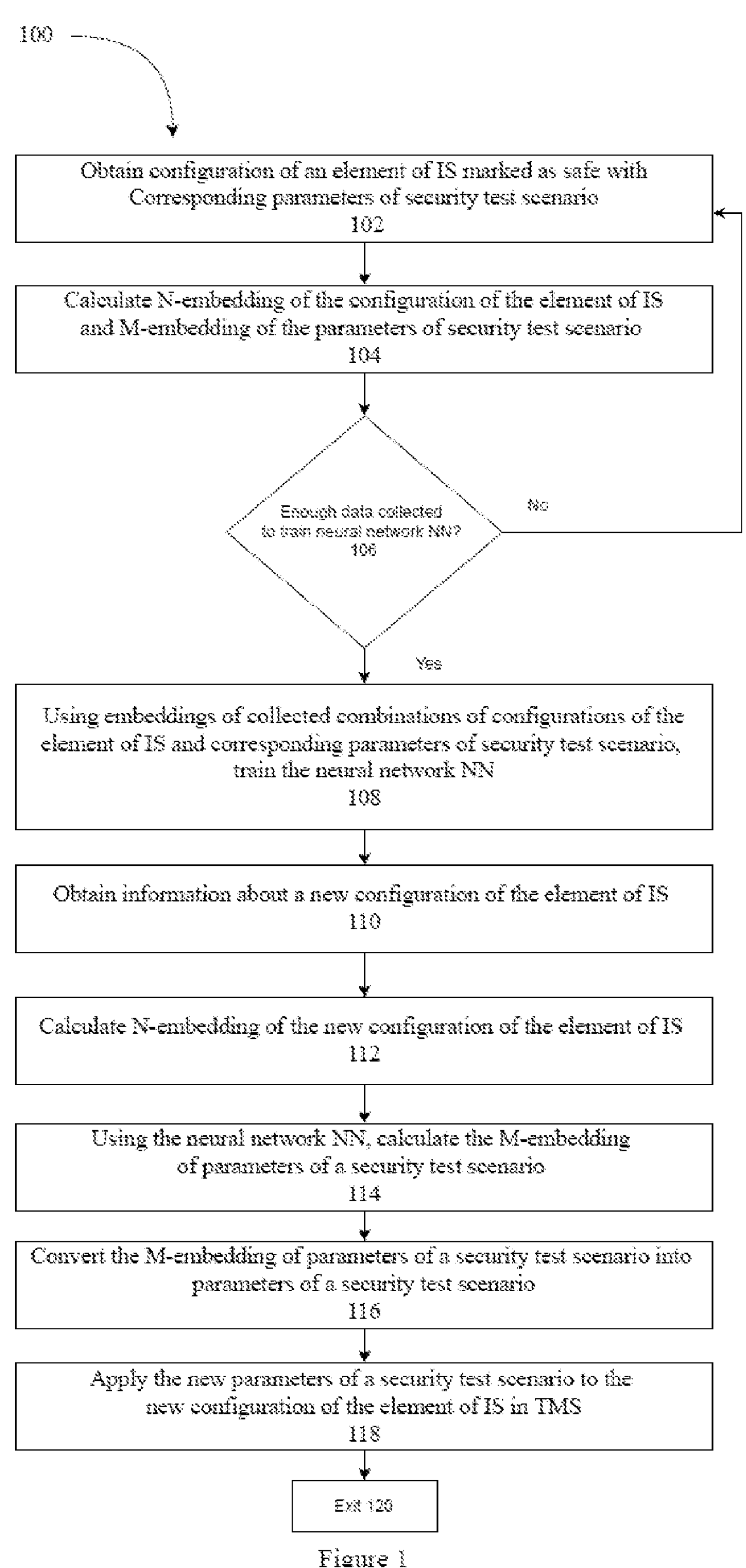
FIG. 1 is a block diagram of a method of automatically generating parameters of a security test scenario, in accordance with one embodiment.

The method and system of the present disclosure collect historical data about the configurations of elements of an SUT that are marked as safe and parameters of security test scenarios that correspond to each of the configurations.

Historical data is collected to configure an AI system. Examples of such AI systems include expert systems and machine learning systems.

A collection is made of pairs of configurations of the element of SUT that are marked safe and corresponding parameters of security test scenarios.

A calculation is then made of N-embeddings of configurations of the element of SUT and M-embeddings of corresponding parameters of security test scenarios.

Pairs of M-embeddings and N-embeddings are used to train a neural network NN configured to take N-embeddings as an input and output M-embeddings.

After a sufficient number of pairs of M-embeddings and N-embeddings have been collected to train the neural network NN, the system is ready to start automatically generating parameters of the security test scenario.

Each time the system obtains information about a new configuration of the element of SUT, the system generates an N-embedding of that configuration, inputs it into the neural network NN that produces an M-embedding as output.

The system further generated parameters of the security test scenario using that N-embedding.

Once the new parameters of the security test scenario have been generated, these parameters are applied to the new configuration of the element of IS in the test management system TMS.

During penetration testing, all aspects of security are potentially at issue. These include, for example, confidentiality, integrity, and availability of an information system. Other targets of testing include possible denial-of-service attacks that may lead to the system becoming not available.

There are multiple approaches to testing, including scanning for open ports, versions of COTS software with known vulnerabilities, source code analysis, protocol analysis, use of scripts developed by third parties, and development of tests as a part of the Waterfall and Agile software development approaches.

Testing frequently uses two teams. The Red Team attacks the system. The Blue Team takes measures to develop security controls to mitigate the vulnerabilities identified by the Red team.

In general, the two major classes of elements contributing to the security of a system are the system itself as a collection of elements, including their settings, and the environment in which the system works, with its characteristics. The system may comprise multiple elements, such as software programs, hardware units, and communication channels between them. There are numerous different types of testing including unit testing, integration testing, protocol testing, HTML, script, or SQL injection testing, cross-site scripting testing, testing against parameter change attacks, load testing, pick testing, escalation of privilege testing, testing against replay attack, testing against man-in-the middle attacks, testing against social engineering attacks, IP address and port scanning, etc. Each one of these types of tests may have many embodiments with different parameters.

Some of these tests are only relevant for certain elements of the system or their combinations, as well as to certain environments.

A change in settings of any such element, as well as addition or removal of an element may affect the overall security of the system. For example, a version of a third-party library used by the system may change, a protocol used to communicate between different parts of the system may change, or an internally developed element may be updated.

The environment is the rest of the digital universe outside of the system. The boundary is defined in each case and typically includes the operating system on which different elements of the system are running and external elements, including software or hardware units, communicating directly with the system. The scope of the definition of the environment may be smaller or larger in a particular case.

A change in the configuration of the environment affects the security of the system. For example, if a software element of the system is moved from a dedicated hardware server to a shared hardware server or to a virtual server, the security environment of the system changes.

Testing of a system consists of execution of a multitude of test steps of different complexity and scope with individual settings that include relationships between such steps.

During its routine functionality, SUT operates with the members of the Red and Blue teams, system elements, their properties, environment, its characteristics, test steps (manual, automated, and mixed), their settings, test results, workflow, test execution automation, report generation, and generating historical data.

Security testing comprises several major phases: information gathering, analysis and planning, vulnerability scanning, exploitation, risk analysis and remediation suggestion, and reporting.

The following example illustrates the disclosed method and system in an example.

Company C uses a test management system (TMS) to manage the testing process of a system under test SUT—a financial transaction processing system with interfaces to third party financial institutions F(1), . . . , F(N) implemented through an encrypted file exchange through an FTP server. The testing process continues until the SUT reaches a safe state.

A safe state is such a state of an information system that all identified risks have been mitigated to an acceptable level.

Each interface is a separate component comprising a standalone physical server hosting an FTP server, a special set of authentication credentials for the financial institution F(i) to which that interface is connected and implements a slightly different protocol adjusted for the configurations, policies and procedures of F(i).

TMS contains information about system components, physical, software, or logical, test plan, and testing staff. In an embodiment, TMS contains additional information about scheduling automated tests, and test execution results.

A test plan comprises information about tests, automated or manual, their relationship to system components and to members of testing staff. TMS further contains additional parameters for tests, for example, IP address and port number for vulnerability scan.

At some point, the SUT has N interfaces already implemented and tested or configured to test.

The SUT contains information about N similar components and their relationship to individual testing steps wherein individual testing steps that are a part of the existing test plan are assigned to each one of the N similar components and to test team members or roles.

In one example, the element of IS is a physical server. In that example, the configuration of the element comprises an array with one Boolean value for each one of the 65,536 ports on which a software installed on that physical server is listening.

In that example, the security test scenario for that element is a vulnerability scanning with parameters comprising an array with one Boolean value for each one of the 65,536 ports on which the scanner will expect a listening software to respond.

If the vulnerability scanner encounters a response on a port that is not in the list of open ports, it will fail. If it does not, it will pass.

During testing, only configurations of the server are tested when one port is open.

For each one of these configurations, the corresponding port is marked in the test scenario as open (corresponding value is set to True represented by "1" while others are set to False represented by "0").

After the test scenario is executed successfully, the configuration with one open port is marked as Safe in the test management system TMS, and that configuration is recorded along with the corresponding settings of the security test scenario.

Once each port has been tested successfully, the test management system TMS contains information about 65,536 configurations of the element of IS marked Safe and their corresponding parameters of the security test scenario.

In this example, the N-embedding of configuration of the element of IS is 65,536 bit long and the M-embedding of parameters of the testing scenario is also 65,536 bit long.

The collection of 65,536 configurations of the element of IS in this example form a diagonal matrix that has a non-zero determinant which is sufficient to train a neural network NN of size N×M, in this case 65,536×65,536.

Once the neural network NN has been trained, the system is ready to automatically generate new parameters of the security testing scenario based on a new configuration of the element of IS.

Specifically, a new configuration of the element is communicated to the system, for example, that configuration has K<=N ports P(1), P(2), . . . , P(K) open.

The N-embedding of the configuration of the element is a sequence of N ones or zeroes wherein all values are zeros except for the positions that have the open ports P(1), P(2), . . . , P(K).

That N-embedding is used as an input into the neural network NN that outputs an M-embedding that consists of the same sequence of ones and zeros.

That M-embedding is used to generate parameters of the security test scenario where each zero is converted to a False value for the corresponding port and one is converted into a True value for the corresponding port indicating if a given port is expected to contain a listening software.

At the final step, the system applies the new parameters of the security test scenario by re-configuring the security test scenario corresponding to the new configuration of the element of IS to match the newly generated parameters of the security test scenario generated based on the M-embedding that was output by the neural network NN in response to the N-embedding of the new configuration of the element of IS.

FIG. 1 depicts the block-level diagram of the disclosed method 100 of automatically generating parameters of a security test scenario.

Historical information is obtained about the configurations of an element of SUT that is marked as safe and parameters of a corresponding test scenario 102.

N-embedding of the configuration of the element of SUT that is marked as safe is calculated, along with M-embedding of corresponding parameters of test scenario 104.

A check is made to determine whether the collected pairs of N-embeddings of configurations of the element of SUT and corresponding M-embeddings of parameters of test scenarios are sufficient to train neural network NN 106.

If all of the collected pairs are insufficient to train the neural network NN, the method goes back to step 102 to collect another pair from the test management system.

If enough pairs were collected to train the neural network NN, these pairs of N-embeddings and M-embeddings are used to train the neural network NN 108.

At step 110, information is obtained about a new configuration of the element of SUT.

An N-embedding of that configuration is calculated at step 112.

The calculated N-embeddings of the configuration is passed to the neural network NN that takes it as input and outputs an M-embedding of parameters of the security test scenario at step 114.

The generated M-embedding is used to generate parameters of a security test scenario at step 116.

The generated parameters of a security test scenario to the new configuration of the element of SUT at step 118 and exits at step 120.

Figure 2:
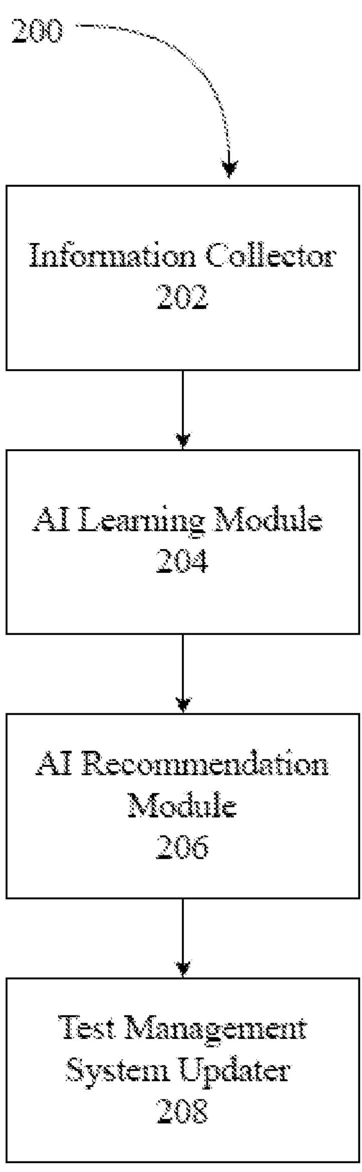
FIG. 2 is a block diagram of the system that implements the generic method of automatically generating parameters of a security test scenario, in accordance with one embodiment.

FIG. 2 depicts a block-level diagram of the system for automatically updating security test scenario 200.

Information Collector 202 is configured to collect historical data about configurations of an element of SUT marked as safe in a test management system (TMS) and corresponding parameters of security testing scenario 202.

The AI Learning Module 204 is configured to receive information from the Information Collector 202 about pairs of configurations of the element of SUT marked as safe in the test management system (TMS) and corresponding parameters of security test scenario; to calculate N-embeddings of configurations of the element of SUT and M-embeddings of corresponding parameters of security test scenarios; and to use pairs of N-embeddings and corresponding M-embeddings to train a neural network NN configured to take as input N-embeddings and output M-embeddings.

AI recommendation module 206 is configured to receive information about the new configuration of the element of SUT, calculate N-embedding of that configuration, use that embedding as input into the neural network NN, receive the M-embedding output by the neural network NN, and generate, based on the M-embedding, parameters of security test scenario.

The test management system updater applies the generated parameters of the security test scenario to the new configuration of the element of SUT in TMS.

The invention claimed is:

1. A method for automatically generating a security test scenario for an element of a computer system comprising a plurality of ports, using a neural network trained on stored historical data about configurations of the element which were marked safe and parameters of security test scenarios corresponding to these configurations, comprising:

collecting information about different historical configurations of the element which were marked as safe in a previous security test, the information comprising a plurality of element settings, and collecting parameters of security test scenarios corresponding to each historical configuration, wherein the security test parameters comprise port settings corresponding to a safe state of the element;

generating N-embeddings of the different historical configurations of the element of the computer system of fixed length N from the plurality of settings and generating M-embeddings of the parameters of the security test scenarios of fixed length M corresponding to each of the different historical configurations;

training a neural network ("NN") with an input layer of size N and an output layer of size M using the N-embeddings and the M-embeddings of the collected information, wherein the trained NN is configured to take as an input a given N-embedding of a configuration of the element of the computer system and to output an M-embedding of parameters of a security test scenario of fixed length M, wherein the output M-embedding is an array of numeric representations of test scenario parameters comprising port settings corresponding to a safe state of the element;

detecting a new configuration of the element of the computer system and obtaining information from the element about the new configuration;

generating an N-embedding of the detected, new configuration of the element of the computer system, the N-embedding comprising an array of numeric representations of the element's new configuration;

generating, with the trained NN, an M-embedding comprising an array of numeric representations of parameters of a security test scenario by inputting the N-embedding of the new configuration of the element of the computer system to the trained NN;

generating parameters of a security test scenario for the new configuration from the generated M-embedding, wherein the generated parameters comprise port settings;

applying the security test scenario to the new configuration of the element of the computer system by testing the element in accordance with the generated test parameters.

2. The method of claim 1, wherein the configuration of the element of the computer system comprises settings corresponding to software version, IP address, port number, number of failed login attempts, password strength, amount of available CPU, amount of available memory, available bandwidth, format of incoming parameters, license type, or maintenance schedule.

3. The method of claim 1, wherein the collected information about different historical configurations of the element which were marked as safe in a previous security test and the collected parameters of security test scenarios corresponding to each historical configuration comprise N-embeddings and M-embeddings received from a source other than the computer system.

4. The method of claim 1, wherein applying the security test scenario to the new configuration of the element of the computer system comprises automatic execution of the security test scenario.

5. A method for automatically generating a security test scenario for an element of a computer system comprising a plurality of ports using stored historical data about configurations of the element of which were marked as having successfully completed security testing and parameters of security test scenarios corresponding to these configurations, comprising:

collecting information about different historical configurations of the element which were marked as having successfully completed security testing in a previous security test, the information comprising a plurality of settings, and collecting parameters of security test scenarios corresponding to each historical configuration, wherein each security test scenario comprises a plurality of port settings;

generating N-embeddings of the different historical configurations of the element of the computer system of fixed length N from the plurality of settings and generating M-embeddings of the parameters of the security test scenarios of fixed length M corresponding to each of the different historical configurations;

training a neural network NN with input layer of size N and output layer of size M using the N-embeddings and the M-embeddings of the collected information, wherein the trained NN is configured take as an input a test N-embedding of a configuration of the element of the computer system and to output an M-embedding of the parameters of a security test scenario of fixed length M, wherein the output M-embedding is an array of numeric representations of test scenario parameters comprising port settings corresponding to a state of the element that is likely to successfully complete security testing;

detecting a new configuration of the element of the computer system and obtaining information from the computer system about the new configuration of the element of the computer system;

generating an N-embedding of the new configuration of the element of the computer system, the N-embedding comprising an array of numeric representations of the element's new configuration;

generating, with the trained NN, an M-embedding comprising an array of numeric representations of parameters of a security test scenario by inputting the N-embedding of the new configuration of the element of the computer system to the trained NN;

generating parameters of a security test scenario for the new configuration from the generated M-embedding, wherein the generated parameters comprise values indicating port settings for the plurality of ports;

applying the security test scenario to the new configuration of the element of the computer system by testing the element in accordance with the generated test parameters.

6. The method of claim 5, wherein the configuration of the element of the computer system comprises settings corresponding to software version, IP address, port number, number of failed login attempts, password strength, amount of available CPU, amount of available memory, available bandwidth, format of incoming parameters, license type, or maintenance schedule.

7. The method of claim 5, wherein the collected information about different historical configurations of the element which were marked as safe in a previous security test and the collected parameters of security test scenarios corresponding to each historical configuration comprise N-embeddings and M-embeddings received from a source other than the computer system.

8. The method of claim 5, wherein applying the security test scenario to the new configuration of the element of the computer system comprises automatic execution of the security test scenario.

9. The method of claim 1, wherein the element of the computer system is a server and the configuration of the element comprises a new software version.

10. The method of claim 1, wherein the element of the computer system is a server and the configuration of the element comprises at least one port number.

11. The method of claim 5, wherein the element of the computer system is a server and the configuration of the element comprises a new software version.

12. The method of claim 5, wherein the element of the computer system is a server and the configuration of the element comprises at least one port number.

13. A method for automatically generating a security test scenario for an element of a computer system comprising a plurality of ports, using a neural network trained on stored historical data about configurations of the element which were marked safe and parameters of security test scenarios corresponding to these configurations, comprising:

detecting a new configuration of the element of the computer system and obtaining information from the computer system about the new configuration of the element of the computer system, the new configuration comprising a plurality of settings;

generating an N-embedding of the new configuration of the element of the computer system, wherein each N-embedding is an array of numeric representations of the element's configuration;

generating an M-embedding by inputting the N-embedding of the new configuration of the element of computer system in the neural network NN, wherein each M-embedding is an array of numeric representations of the historical tests performed on the element of the computer system and wherein the trained NN is configured to take as an input a test N-embedding of a configuration of the element of the computer system, process the test N-embedding through a series of weighted connections and activation functions, and to output an M-embedding of parameters of a security test scenario of fixed length M;

generating parameters of a security test scenario for the new configuration from the generated M-embedding, wherein the generated parameters comprise values indicating port settings for the plurality of ports;

applying the security test scenario to the new configuration of the element of the computer system and generating a plurality of test results for the element using the security test scenario; and updating the trained NN with the plurality of generated test results when the generated test results indicate that the new configuration results in a marked safe state of the computer system.

14. The method of claim 13, wherein the configuration of the element of the computer system comprises settings corresponding to software version, IP address, port number, number of failed login attempts, password strength, amount of available CPU, amount of available memory, available bandwidth, format of incoming parameters, license type, or maintenance schedule.

15. The method of claim 13, wherein the collected information about different historical configurations of the element when the computer system has been marked as safe in a security test and the collected parameters of security test scenarios corresponding to each historical configuration comprises N-embeddings and M-embeddings received from a source other than the computer system.

16. The method of claim 13, wherein applying the security test scenario to the new configuration of the element of the computer system comprises automatic execution of the security test scenario.

17. The method of claim 13, wherein the element of the computer system is a server and the configuration of the element comprises a new software version.

18. The method of claim 13, wherein the element of the computer system is a server and the configuration of the element comprises at least one port number.

19. The method of claim 13, wherein the element of the computer system is a server and the configuration of the element comprises a plurality of open ports.

20. The method of claim 13, wherein the element of the computer system is a server and the configuration of the element comprises a plurality of failed login attempts.

* * * * *